(12) United States Patent
Huang et al.

(10) Patent No.: US 6,993,452 B2
(45) Date of Patent: *Jan. 31, 2006

(54) DISTANCE MEASURE FOR PROBABILITY DISTRIBUTION FUNCTION OF MIXTURE TYPE

(75) Inventors: Qian Huang, Rockville, MD (US); Zhu Liu, Middletown, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/849,737

(22) Filed: May 4, 2001

(65) Prior Publication Data

US 2002/0069032 A1    Jun. 6, 2002

Related U.S. Application Data

(60) Provisional application No. 60/201,867, filed on May 4, 2000.

(51) Int. Cl.
G06F 15/00 (2006.01)

(52) U.S. Cl. .................. 702/179; 702/69; 702/110; 702/189; 706/12; 706/14; 706/15; 703/2; 703/5; 704/200; 704/240

(58) Field of Classification Search ............ 702/69, 702/110, 111, 124, 126, 158, 179–181, 183, 702/189, FOR. 103, 104, 134, 139, 155, 702/170, 171; 706/12, 14, 15, 19–21; 703/2, 703/5; 704/200–201, 226, 231, 233, 240, 704/245, 254–256, 500

See application file for complete search history.

(56) References Cited

U.S. PATENT DOCUMENTS 5,706,391 A * 1/1998 Yamada et al. .............. 395/2.4

(Continued)

OTHER PUBLICATIONS

Minh N. Do, Fast Approximation of Kullback-Leibler Distance for Dependence Trees and Hidden Markov Models, IEEE, Jan. 1999, pp. 1-4.*

(Continued)

*Primary Examiner*—Hal Wachsman
*Assistant Examiner*—Elias Desta

(57) ABSTRACT

In accordance with our invention, for two mixture-type probability distribution functions (PDF's), G, H, $$G(x) = \sum_{i=1}^{N} \mu_i g_i(x), \quad H(x) = \sum_{k=1}^{K} \gamma_k h_k(x),$$

where G is a mixture of N component PDF's $g_i$ (x), H is a mixture of K component PDF's $h_k$ (x), $\mu_i$ and $\gamma_k$ are corresponding weights that satisfy we define their distance, $D_M(G, H)$, as $$\sum_{i=1}^{N} \mu_i = 1 \text{ and } \sum_{k=1}^{K} \gamma_k = 1;$$

$$D_M(G, H) = \min_{w=[\omega_{ik}]} \sum_{i=1}^{N} \sum_{k=1}^{K} \omega_{ik} d(g_i, h_k)$$

where $d(g_i, h_k$ is the element distance between component PDF's $g_i$ and $h_k$ and w satisfie $$\omega_{ik} \geq 0,\ 1 \leq i \leq N,\ 1 \leq k \leq K;$$

and $$\sum_{k=1}^{K} \omega_{ik} = \mu_i,\ 1 \leq i \leq N,\ \sum_{i=1}^{N} \omega_{ik} = \gamma_k,\ 1 \leq k \leq K.$$

The application of this definition of distance to various sets of real world data is demonstrated.

18 Claims, 7 Drawing Sheets

U.S. PATENT DOCUMENTS 6,246,982 B1 * 6/2001 Beigi et al. ............... 704/238

6,567,771 B2 * 5/2003 Erdogan et al. ............ 702/189

6,591,235 B1 * 7/2003 Chen et al. ............... 704/236

OTHER PUBLICATIONS

Zhang et al., An Improved HMM/VQ Training Procedure for Speaker-Independent Isolated Word Recognition, IEEE, Apr. 1994, pp. 722-725.*

* cited by examiner

Illustration of element distance

DISTANCE MEASURE FOR PROBABILITY DISTRIBUTION FUNCTION OF MIXTURE TYPE

CROSS-REFERENCE TO RELATED APPLICATIONS

This application claims priority to the provisional patent application Ser. No. 60/201,867, filed on May 4, 2000.

BACKGROUND OF THE INVENTION

Under various situations, it is necessary to measure the difference between two Probability Distribution Functions (PDF's). For example, in text independent speaker recognition using Gaussian mixture models (GMM), the classification of a given piece of speech can be done by comparing its GMM model with a set of given GMM models. D. A. Reynolds and R. C. Rose, "Robust Test-Independent Speaker Identification Using Gaussian Mixture Speaker Models," IEEE *Trans. on Speech and Audio Processing*, Vo. 3, No. 1, pp. 72–83 (1995). Another scenario is to detect the difference among observation probabilities, again often characterized by GMM, of each state of a continuous Hidden Markov Model (HMM) so that similar states can be merged to simplify the overall model in speech recognition tasks. Q. Huang, Z. Liu, A. Rosenberg, D. Gibbon, B. Shahraray, "Automated Generation of News Content Hierarchy by Integrating Audio, Video, and Text Information," *Proc. of IEEE ICASSP* 99, Vol. IV, pp. 3025–28 (Phoenix, March, 1999). Although much needed, there is so far no simple way to measure the distance between two mixture PDF's.

There are three well-known properties of a distance measure, namely non-negativeness, symmetry, and triangular inequality. Let $G(x)$, $F(x)$, and $H(x)$ be three PDF's. Denote $D(G,F)$ as the distance between $G(x)$ and $F(x)$, then the three properties can be formally expressed as:

$$D(G,F) \geq 0, \text{ and } D(G,F)=0 \text{ iff. } G=F \quad (1)$$

$$D(G,F)=D(F,G) \quad (2)$$

$$D(G,H)+D(H,F) \geq D(G,F) \quad (3)$$

There are different approaches to measure the difference between two PDF's. We summarize them into three categories. They may or may not satisfy the three distance properties.

The first approach defines the distance in $L^r$ space by $$D_{L^r}(G, F) = \left( \int_{x \in X} |G(x) - F(x)|^r dx \right)^{1/r}. \quad (4)$$

where commonly used values of r may be 1 or 2. Although satisfying all three distance properties, $D_L^r$ is usually computed by numerical methods. Therefore, the computational complexity can easily go out of control with the increasing dimension.

The second approach is the relative entropy or Kullback Leibler distance (KLD). T. M. Cover and J. A. Thomas, *Elements of Information Theory* (John Wiley & Sons, 1991).

It is defined as $$D_{KL}(G, F) = \int_{x \in Z} G(x) \log \frac{G(x)}{F(x)} dx \quad (5)$$

It is obvious that the straightforward KLD defined above satisfies only the first property. By extending the original KLD to $D_{KL}(G,F)+D_{KL}(F,G)$, one can force it to meet the symmetry property. Although the third property does not hold, the extended KLD is popular in many applications due to the lack of better alternatives. To compute KLD, different approximation schemes are often employed. For example, data sequences $T_G$ and $T_F$ can be generated from models G and F and then the average log-likelihood ratio of the sequences with respect to $G(x)$ and $F(x)$ can be used to approximate the extended KLD. That is, $$D_{Seq}(G, F) = \frac{1}{N} \left( \left| \log \frac{p(T_G|G)}{p(T_G|F)} \right| + \left| \log \frac{p(T_F|F)}{p(T_F|G)} \right| \right), \quad (6)$$

where N is the length of the data sequences $T_G$ and $T_F$. The performance of $D_{Seq}$ is a function of both the value of N as well as the data generation procedure. The bigger N is, the more reliable the approximation is. At the same time, it makes the estimation more expensive.

The third approach is to compute the distance directly from the respective parameters. Ideally, such a method can achieve at least comparable performance with a precise closed form solution that subsequently leads to a much more efficient computational procedure. Unfortunately, the existing method in this category is capable of handling only simplified cases (or degenerated cases). For example, if $G(m_1, \sigma_1)$ and $F(m_2, \sigma_2)$ are single Gaussians from two individual PDFs, where $m_1$, $m_2$, $\sigma_1$, and $\sigma_2$ are their corresponding means and standard deviations, the extended KLD between G and F in this simplified single mixture case can be computed directly from the model parameters to be $$D_P(G, F) = \frac{\sigma_1^2}{\sigma_2^2} + \frac{\sigma_2^2}{\sigma_1^2} - 2 + \left( \frac{\sigma_1^2 + \sigma_2^2}{\sigma_1^2 \sigma_2^2} \right)(m_1 - m_2)^2, \quad (7)$$

ignoring the constant multiple.

Even though the computation of $D_P$ is simple and can be extended to handle Gaussians of higher dimensions, it cannot deal with multiple mixture PDF's. Even with the possibility of simplifying the models (using one Gaussian to approximate multiple Gaussians) so that (7) can be applied, the outcome often indicates that it is not effective. This can be illustrated using a simple example. Consider two GMM's $G=\frac{1}{3}*N(-2, 1)+\frac{2}{3}*N(1, 1)$ and $F=\frac{1}{3}*N(2, 1)+\frac{2}{3}*N(-1, 1)$, where $N(m, \sigma)$ is a Gaussian distribution with mean m and standard deviation $\sigma$. Both G and F have two Gaussian components that are obviously distributed quite differently. Hence, the distance between G and F is clearly not zero. To apply (7), both G and F have to be simplified into one mixture Gaussian, denoted by $G'(m_G, \sigma_G)$ and $F'(m_F, \sigma_F)$, where the new mean and standard deviation can be derived as the weighted average of the means and standard deviations from their components. This yields the same mean ($m_G=m_F=0$) and same standard deviation ($\sigma_G=\sigma_F$) for both G' and F' which leads to $D_P(G', F')=0$. Evidently, the measure derived this way failed to capture the obvious difference between the two original PDF's.

Therefore, there is a need to develop other alternatives that can effectively measure the difference between mixture PDF's directly from their model parameters.

SUMMARY OF THE INVENTION

In accordance with our invention, for two mixture-type probability distribution functions (PDF's), G, H, $$G(x) = \sum_{i=1}^{N} \mu_i g_i(x), \quad H(x) = \sum_{k=1}^{K} \gamma_k h_k(x),$$

where G is a mixture of N component PDF's $g_i(x)$, H is a mixture of K component PDF's $h_k(x)$, $\mu_i$ and $\gamma_k$ are corresponding weights that satisfy $$\sum_{i=1}^{N} \mu_i = 1 \text{ and } \sum_{k=1}^{K} \gamma_k = 1;$$

we define their distance, $D_M(G, H)$, as $$D_M(G, H) = \min_{w=[\omega_{ik}]} \sum_{i=1}^{N} \sum_{k=1}^{K} \omega_{ik} d(g_i, h_k)$$

where $d(g_i, h_k)$ is the element distance between component PDF's $g_i$ and $h_k$ and w satisfies $$\omega_{ik} \geq 0, \ 1 \leq i \leq N, \ 1 \leq k \leq K,$$

and $$\sum_{k=1}^{K} \omega_{ik} = \mu_i, \ 1 \leq i \leq N, \ \sum_{i=1}^{N} \omega_{ik} = \gamma_k, \ 1 \leq k \leq K.$$

The definition of distance can be usefully applied to various sets of real world data as demonstrated below.

BRIEF DESCRIPTION OF THE DRAWINGS

These and other objects, features and advantages of our invention can be better understood from the following detailed description of the invention in which.

DETAILED DESCRIPTION OF THE INVENTION

This detailed description is organized as follows. In section I we present our metric. In section II we demonstrate that the new metric satisfies the three distance properties under certain constraints. Comparison between the proposed and other existing measures is given in section III. Some of the preliminary results from applying the new metric to audio based content retrieval applications is shown in section IV.

1. Parametric Distance Metric for Mixture PDF

Suppose G(x) and H(x) are two PDF's of mixture type, $$G(x) = \sum_{i=1}^{N} \mu_i g_i(x), \qquad H(x) = \sum_{k=1}^{K} \gamma_k h_k(x), \tag{8}$$

where G(x) is a mixture of N component PDF's $g_i(x)$, H(x) is a mixture of K component PDF's $h_k(x)$ and $\mu_i$ and $\gamma_k$ are corresponding weights that satisfy $$\sum_{i=1}^{N} \mu_i = 1 \text{ and } \sum_{k=1}^{K} \gamma_k = 1. \tag{9}$$

Figure 1A:
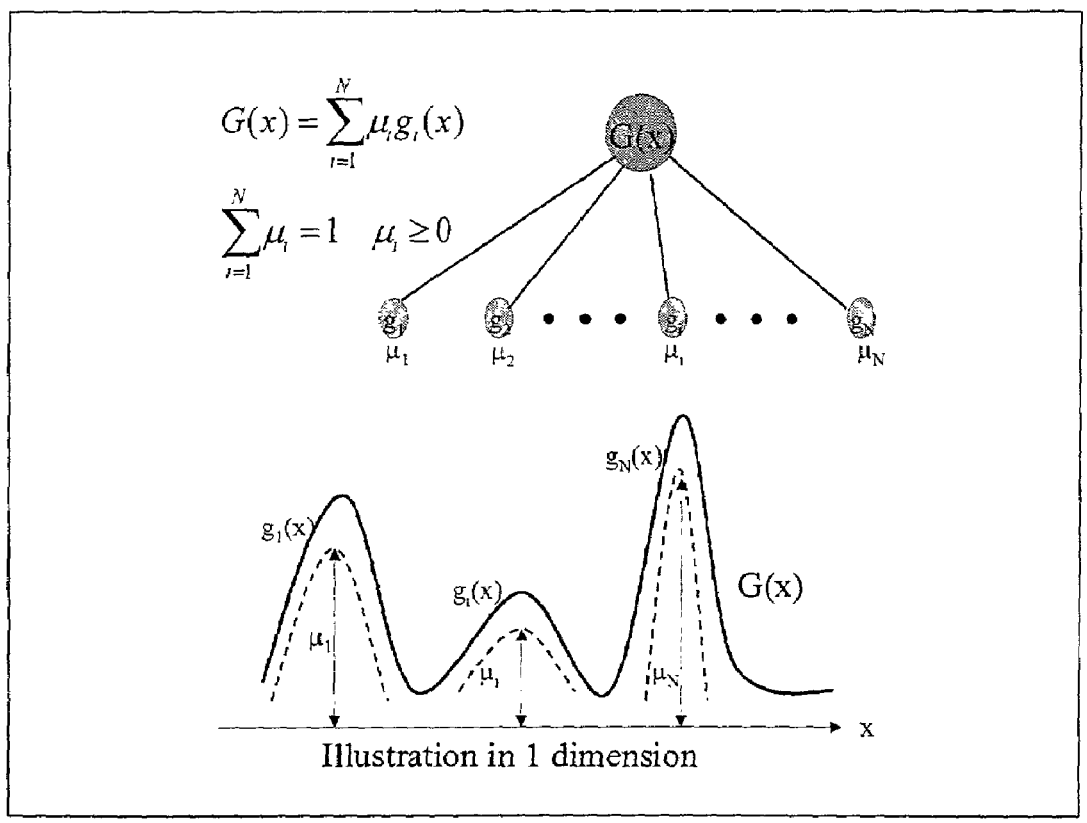
FIG. 1 is an illustration of the relationship between two probability distribution functions useful in understanding equations 8–12.
Figure 1B:
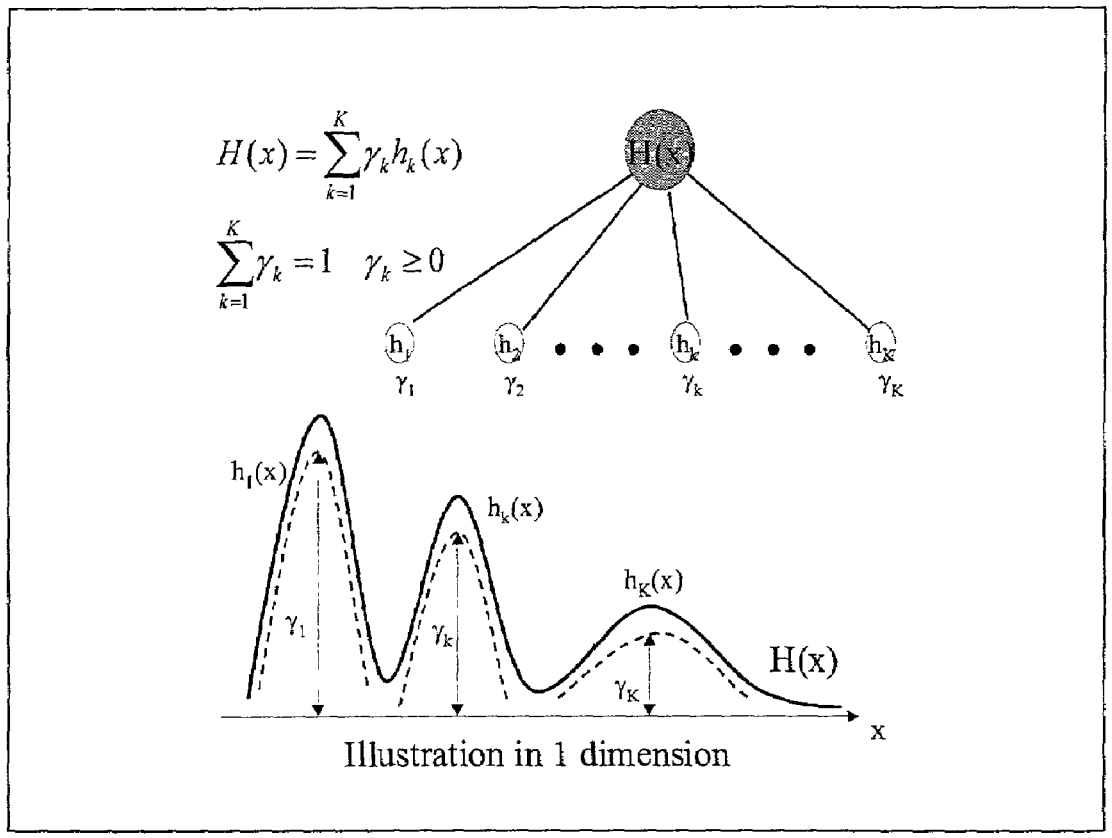
Figure 1C:
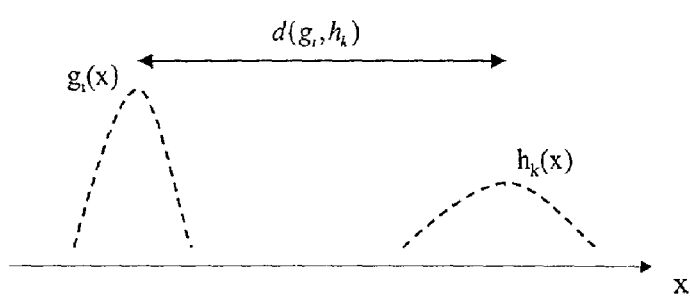

FIGS. 1(a) and 1(b) illustrate the structure of G(x) and H(x). A one-dimensional example is shown for each PDF at the bottom of the figures. Our invention is inspired by two observations. First, the distance between the pair of element PDF's ($g_i(x)$ and $h_k(x)$) is easy to compute. For example, the distance between two single Gaussians can be determined directly from their parameters. FIG. 1(c) shows one simple distance measurement between two element PDF's. Second, the distance between two mixture-type PDF's is essentially determined by their components. Although the element distances are not obviously related to the overall distance, our invention is to define a framework so that a meaningful overall distance can be computed directly from all element distances. For simplicity, we will drop the x term in the rest of the formulae in this patent. Denote the distance between a pair of components, say $g_i$ and $h_k$, by $d(g_i, h_k)$.

In accordance with our invention the overall distance between G and H is defined as $$D_M(G, H) = \min_{w=[\omega_{ik}]} \sum_{i=1}^{N} \sum_{k=1}^{K} \omega_{ik} d(g_i, h_k) \tag{10}$$

$\omega_{ik} \geq 0, \ 1 \leq i \leq N, \ 1 \leq k \leq K$ (11)

$$\sum_{k=1}^{K} \omega_{ik} = \mu_i, \ 1 \leq i \leq N, \ \sum_{i=1}^{N} \omega_{ik} = \gamma_k, \ 1 \leq k \leq K. \tag{12}$$

This framework is a fully connected network in which any component $g_i$ in mixture G can interact with any component $h_k$ in H via weighted element distance $\omega_{ik} d(g_i, h_k)$. The degree of interaction is inversely proportional to the element distance and proportional to the mixture weights $\mu_i$ and $\gamma_k$.

Figure 1D:
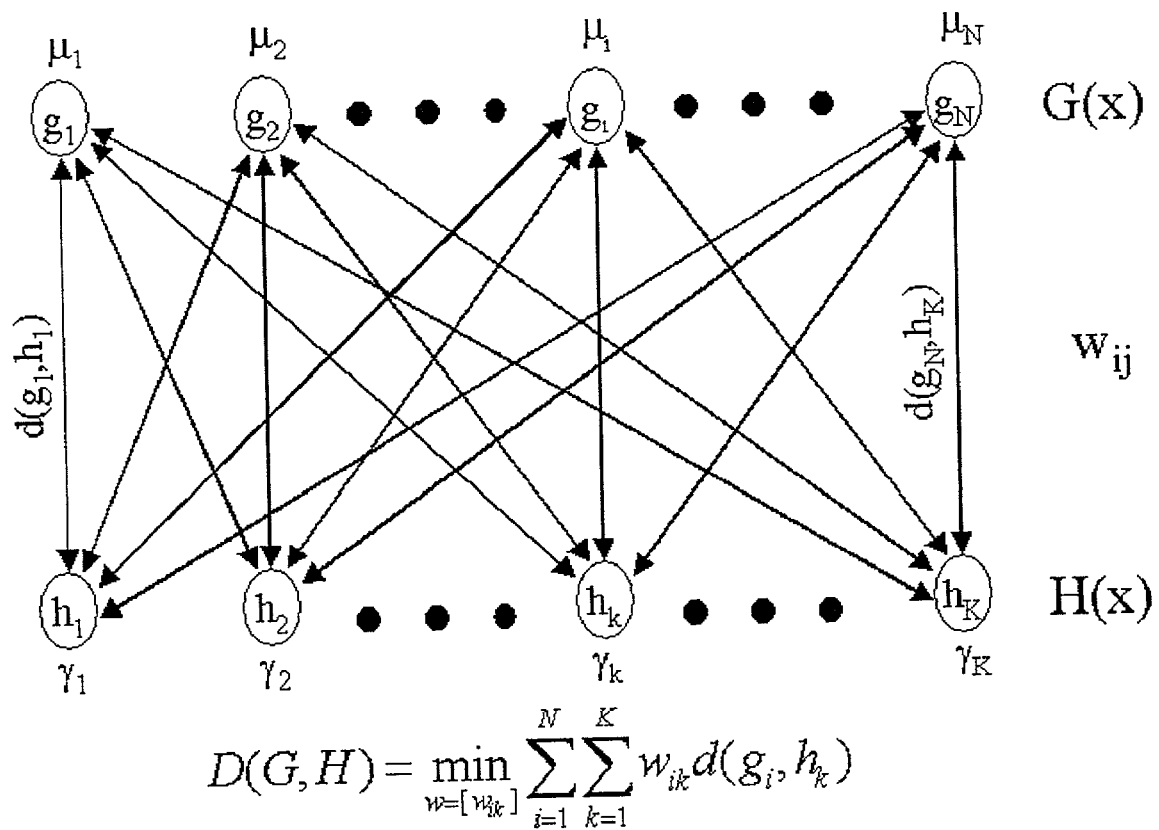

The weights $\omega_{ik}$ are ultimately determined through optimizing with respect to the given constraints in (11, 12). The framework is visualized in FIG. 1(d).

The solution is posed as a linear programming problem. There are many algorithms available to solve it efficiently, such as the simplex tableau method. In our formulation, there are a total of N×K free parameters ($\omega_{ik}$'s) and N+K equality constraints, where only N+K−1 of them are independent. According to the optimization theory, at most N+K−1 of the N×K parameters will not vanish. The problem has a solution because (1) we can easily find a feasible vector that satisfies all the constraints: $\omega_{ik}=\mu_i\times\gamma_k$ and (2) the upper bound for the objective function exists: $\max_{ik}d(g_i, h_k)$.

The proposed framework for the distance metric is general. Since the overall distance is constructed from element distance measures, its generality comes from the fact that the element distance measure is left unspecified. Depending on different application needs, appropriate element distance measures, which may even be non-parametric, can be plugged in and the overall distance between two mixture PDF's can be computed using the same framework. Furthermore, there is no requirement about the specific type of element distribution or that each PDF should be the same type.

II. Proof of Distance Properties

If the element distance $d(g_i, h_k)$ between two mixture components $g_i$ and $h_k$ satisfies the three distance metric properties (1–3), the overall mixture distance $D_M(G, H)$ does as well.

The proof of the first two properties is straightforward. To prove the triangular inequality property, we need to show for any three mixture PDF's G, H, and F that:

$$D_M(G, H) + D_M(H, F) \geq D_M(G, F). \tag{13}$$

The definitions of G and H are the same as (8). F is similarly defined as $$F = \sum_{j=1}^{M} \xi_j f_j,$$

where F is a mixture of M component PDF's $f_j$ and $\xi_j$ is a weight that satisfies $$\sum_{j=1}^{M} \xi_j = 1. \tag{14}$$

Applying definition (10) to both (G, H) and (H, F), we have $$D_M(G, H) = \sum_{i=1}^{N}\sum_{k=1}^{K} w_{ik} d(g_i, h_k) \tag{15}$$

$$D_M(H, F) = \sum_{k=1}^{K}\sum_{j=1}^{M} v_{kj} d(h_k, f_j)$$

where $\omega_{ik}$ and $v_{kj}$ satisfy $$\sum_{i=1}^{N} \omega_{ik} = \sum_{j=1}^{M} v_{kj} = \gamma_k, \quad \sum_{k=1}^{K} \omega_{ik} = \mu_i, \text{ and } \sum_{k=1}^{K} v_{kj} = \xi_j. \tag{16}$$

Then $$\begin{aligned}
D_M(G, H) + D_M(H, F) &= \sum_{i=1}^{N}\sum_{k=1}^{K} w_{ik} d(g_i, h_k) + \sum_{j=1}^{M}\sum_{k=1}^{K} v_{jk} d(h_k, f_j) \\
&= \sum_{k=1}^{K}\left[\sum_{i=1}^{N} w_{ik} d(g_i, h_k) + \sum_{j=1}^{M} v_{jk} d(h_k, f_j)\right] \\
&= \sum_{k=1}^{K}\left[\sum_{i=1}^{N}\sum_{j=1}^{M} \frac{w_{ik}}{\gamma_k} d(g_i, h_k) + \sum_{i=1}^{N}\sum_{j=1}^{M} \frac{w_{ik} v_{jk}}{\gamma_k} d(h_k, f_j)\right] \\
&= \sum_{k=1}^{K}\left[\sum_{i=1}^{N}\sum_{j=1}^{M} \frac{w_{ik} v_{jk}}{\gamma_k} (d(g_i, h_k) + d(h_k, f_j))\right] \\
&\geq \sum_{k=1}^{K}\left[\sum_{i=1}^{N}\sum_{j=1}^{M} \frac{w_{ik} v_{jk}}{\gamma_k} d(g_i, f_j)\right] \\
&= \sum_{i=1}^{N}\sum_{j=1}^{M}\left(\sum_{k=1}^{K} \frac{w_{ik} v_{jk}}{\gamma_k}\right) d(g_i, f_j).
\end{aligned} \tag{17}$$

Let $$\alpha_{ij} = \sum_{k=1}^{k} \frac{w_{ik} v_{jk}}{\gamma_k} \tag{18}$$

then (17) can be rewritten as, $$D_M(G, H) + D_M(H, F) = \sum_{i=1}^{N}\sum_{j=1}^{M} \alpha_{ij} d(g_i, f_i) \tag{19}$$

For any set $\alpha_{ij}$ that satisfies the equation constraints in (12), the following inequality is also true as $D_m(G, F)$ is the outcome of optimization, $$D_M(G, F) \leq \sum_{i=1}^{N}\sum_{j=1}^{M} \alpha_{ij} d(g_i, f_j) \tag{20}$$

In fact, variables $\alpha_{ij}$ indeed satisfy the required constraints:

$$\sum_{i=1}^{N} \alpha_{ij} = \sum_{i=1}^{N}\sum_{k=1}^{K} \frac{w_{ij} v_{jk}}{\gamma_k} = \sum_{k=1}^{K}\sum_{i=1}^{N} \frac{w_{ij} v_{jk}}{\gamma_k} = \sum_{k=1}^{K} v_{jk} = \xi_j \tag{21}$$

-continued $$\sum_{j=1}^{M} \alpha_{ij} = \sum_{j=1}^{M} \sum_{k=1}^{K} \frac{w_{ik} v_{jk}}{\gamma_k} = \sum_{k=1}^{K} \sum_{j=1}^{M} \frac{w_{ij} v_{jk}}{\gamma_k} = \sum_{k=1}^{K} w_{ik} = \mu_i$$

Putting (18) and (19) together, we can obtain (12).

III. Benchmark Against Existing Measures

While we have proved that the new metric possesses certain properties, we also like to demonstrate that it has similar behavior as other existing measures. In this application, we compare it with the two previously defined measures: $D_L^2$ (equation (4)) and $D_{Seq}$ (equation (6)).

Without the loss of generality, we perform the comparison on two dimensional GMM's F and G, each with two mixtures. The element distance used is the extended KLD defined in (7). Specifically, F is defined as $$F = 0.5N\left(\begin{bmatrix}1\\0\end{bmatrix},\begin{bmatrix}1\\1\end{bmatrix}\right) + 0.5N\left(\begin{bmatrix}-1\\0\end{bmatrix},\begin{bmatrix}1\\1\end{bmatrix}\right) \quad (22)$$

where $N(\mu, \sigma)$ is a 2-D Gaussian with mean vector $\mu$ and diagonal covariance $\sigma$. The comparison is conducted in four settings, in each of which, by perturbing the model parameters in G we observe how the three different measures ($D_L^2$, $D_{Seq}$, and $D_M$) react to the changes.

In setting one, G has exactly the same component Gaussians as F with variable mixture weights, controlled through $\mu$, $$G = \mu N\left(\begin{bmatrix}1\\0\end{bmatrix},\begin{bmatrix}1\\1\end{bmatrix}\right) + (1-\mu)N\left(\begin{bmatrix}-1\\0\end{bmatrix},\begin{bmatrix}1\\1\end{bmatrix}\right) \quad (23)$$

where $\mu$ varies between 0 and 0.5.

In setting two, the two component Gaussians of G have the same weights and covariances as those of F but with variable mean vectors, changed along a circle of radius one, controlled through $\alpha$ $$G = 0.5N\left(\begin{bmatrix}\cos\alpha\\\sin\alpha\end{bmatrix},\begin{bmatrix}1\\1\end{bmatrix}\right) + 0.5N\left(-\begin{bmatrix}\cos\alpha\\\sin\alpha\end{bmatrix},\begin{bmatrix}1\\1\end{bmatrix}\right) \quad (24)$$

where $\alpha$ is in the range of 0 to $\pi$.

Setting three is similar to setting two except that we vary the mean vectors of G symmetrically in the first dimension.

$$G = 0.5N\left(\begin{bmatrix}m\\0\end{bmatrix},\begin{bmatrix}1\\1\end{bmatrix}\right) + 0.5N\left(\begin{bmatrix}-m\\0\end{bmatrix},\begin{bmatrix}1\\1\end{bmatrix}\right) \quad (25)$$

where m is from 0.5 to 1.5.

In setting four, G has the same weights and mean vectors for both components but with the covariance vector [δ, δ] changing along both dimensions simultaneously $$G = 0.5N\left(\begin{bmatrix}1\\0\end{bmatrix},\begin{bmatrix}\delta\\\delta\end{bmatrix}\right) + 0.5N\left(\begin{bmatrix}-1\\0\end{bmatrix},\begin{bmatrix}\delta\\\delta\end{bmatrix}\right) \quad (26)$$

where δ ranges from 0.5 to 1.5.

Figure 2:
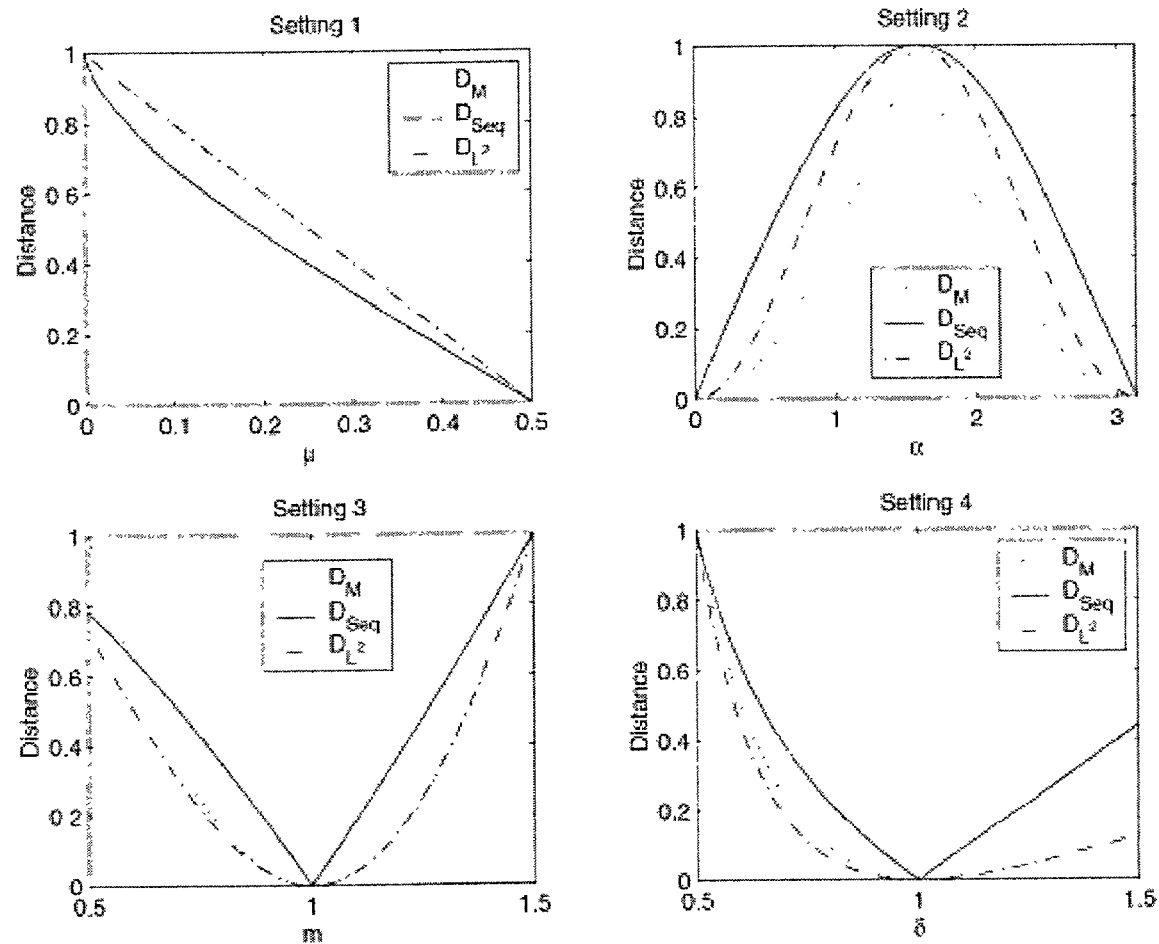
FIG. 2 is four behavior plots comparing our metric with previously defined metrics.

FIG. 2 shows the behavior plots of the three measures under four different settings. All the curves are normalized so that the maximum distance is 1. From these plots, one can see that the overall behavior of all three are consistent in every tested setting. $D_M$ curve overlaps with $D_L^2$ in setting one and part of setting three. In setting four, $D_M$ falls between $D_L^2$ and $D_{Seq}$. These plots demonstrate that the proposed new metric behaves similarly in different scenarios as the existing measures, which have been widely used in practice. But the proposed metric is obviously much more efficient in terms of computation. In addition, with this metric, there is no need to store or to generate data points in order to compare the difference between two PDF's. This is significant, particularly in content based search and retrieval where large amounts of data are pre-indexed, stored, preferably, in a succinct parametric form, and searched in real-time. For example, to retrieve the speech segments of a particular speaker from a large database based on a given query example, all the pre-stored speaker segments in the database have to be matched against the given query sample. In this case, having a measure that can compare the similarity directly from the speaker model parameters will be much more efficient than the ones that require the data points to be generated from the models first and then compared. This is especially true when the search space is large, a realistic scenario in almost all information retrieval tasks.

IV. Enabling More Efficient Audio Based Content Retrieval

To further demonstrate the usefulness of the proposed measure in practical applications, we apply it to the real problem of audio based query-by-example. Given a database of audio events, the task is to search and retrieve some given type of audio event specified by a query example. Each audio event in the database is stored as a set of parameters of a mixture GMM with diagonal covariance matrix. By choosing appropriate element distance measures, we demonstrate that the query/retrieval task using our proposed metric yields comparable performance with more efficient computation.

In our experiment, a database containing 278 audio events is constructed from 7 hours of NBC Nightly News programs. Each event is an acoustically homogeneous segment such as a segment of speech from a particular speaker or a piece of music. A set of acoustic features (Root Mean Square energy and 12 Mel-Frequency Cepstral Coefficients) is extracted from the audio signal and fitted by a four mixture GMM model, whose Ad parameters are stored in the database. Q. Huang, Z. Liu, A. Rosenberg, D. Gibbons, B. Shahraray, Automated Generation of News Content Hierarchy by Integrating Audio, Video, and Text Information, *Proc. of IEEE ICASSP 99*, Volume IV, pp. 3025–28. During query, an audio segment is provided by users as the query example and the retrieval process is to find all the audio segments in the database that have the similar acoustic properties as the query example. For example, if the query sample is a piece of speech from former President Clinton, the task is to find all Clinton speech segments in the database.

Using the given query example, a four mixture GMM is built and compared with all other GMM's stored in the database. Two categories of measures are used to perform the comparison of GMM models. One is the distance measure by sequence $D_{Seq}$ and the other category is the distance measure, $D_M$, described herein. Since our distance measure uses an element distance measure as a building block, we choose, in this experiment, two types of element distance measures to show that the proposed framework has the flexibility to adapt to different application needs. One element distance measure is $L_1$ norm and the other is $L_2$ norm. Both satisfy all three distance properties. Formally the distance between f and g can be written as $$d_{L_r} = \left(\sum_{i=1}^{N} |\mu_i^f - \mu_i^g|^r + \sum_{i=1}^{N} |\sigma_i^f - \sigma_i^g|^r\right)^{1/r}, r=1,2 \quad (27)$$

where N is a feature dimension, $\mu_i^f$, $\mu_i^g$, $\sigma_i^f$, and $\sigma_i^g$ are the i-th mean and standard deviations of f and g.

Even though the mean and standard deviation may have very different dynamic ranges, the choice is reasonable for this application because when one range is much larger than the other, the impact from the smaller one is negligible in the overall distance value. Plugging in the two chosen element distance measures, $L_1$ norm and $L_2$ norm, we obtain two measures, denoted by $D_{ME1}$ and $D_{ME2}$. Using each of the three $D_{Seq}$, $D_{ME1}$ and $D_{ME2}$, we compute the distance between the given query example and each of the audio events in the database. When the distance is smaller than a threshold (which can be set by user), the corresponding audio event is considered as a hit.

To evaluate the retrieval performance, we use Recall Rate (RR) and False detection Rate (FR) which are defined as follows. Assume that there is a total of T recorded events in the database. Given a query example, there are Q events in the database that are true matches. If the retrieval process returns R events as query results, among which C events are the correct match, then RR is defined as C/Q, and FR is defined as (R−C)/(T−Q). Similar to the Receiver Operating Characteristic (ROC) in classical detection theory, H. L. Van Trees, *Detection, Estimation, and Modulation Theory* (John Wiley & Sons, 1967), we can plot a 2-D graph (similar to the PF-PD graph in detection theory) as in FIG. 3 to visualize the retrieval performance.

Figure 3:
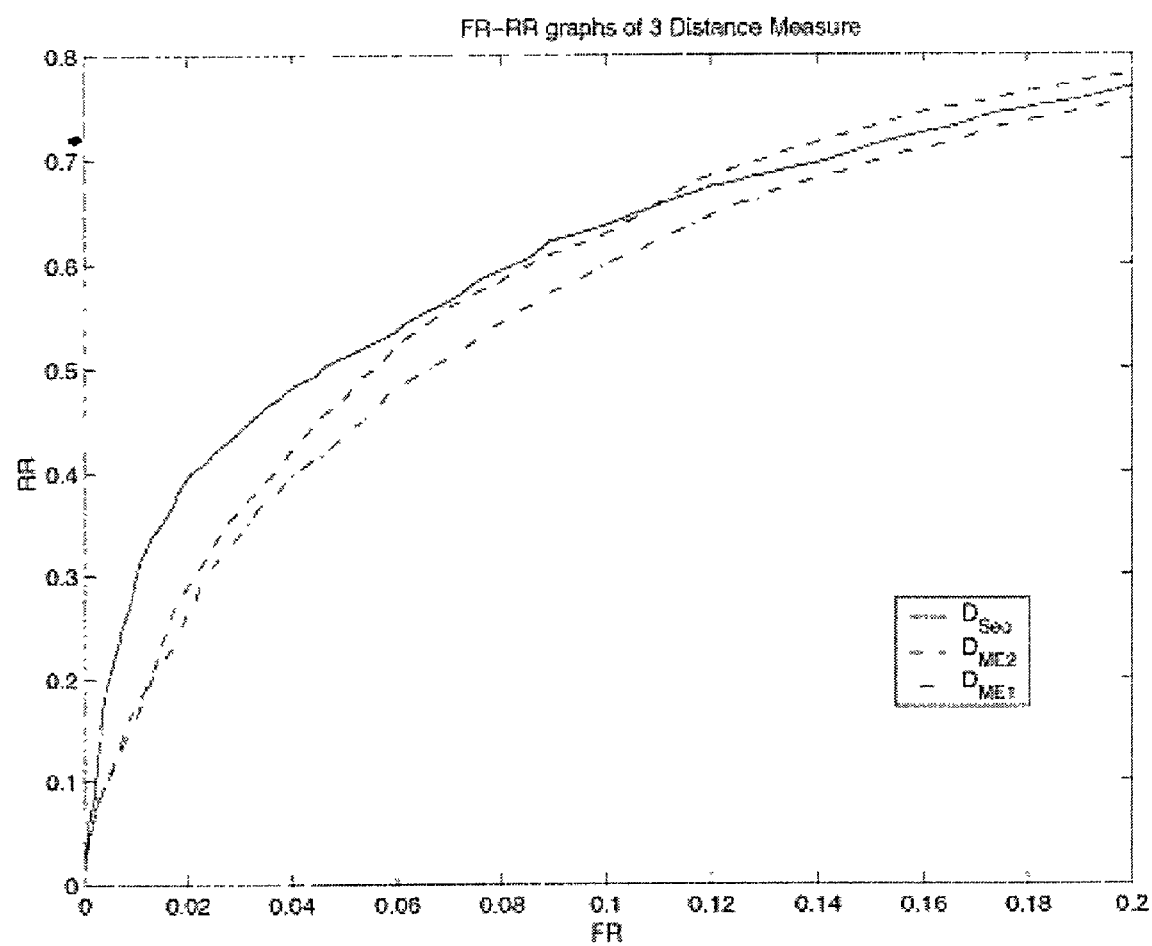
FIG. 3 is a plot of retrieval performance.

The query is for a particular speaker, the anchor of NBC Nightly News, Tom Brokaw. In the database, there are 55 segments that are Tom Brokaw's speeches. We use each of them as a query example and compute the corresponding FR-RR graph. FIG. 3 shoes the average FR-RR graph of all the query performance. As it can be seen from the figure, $D_{ME1}$ and $D_{DM2}$ display similar performance as $D_{Seq}$. When FR<0.11, $D_{ME2}$ is slightly worse than $D_{Seq}$ and $D_{ME2}$ is slightly better than $D_{Seq}$ when FR>0.11. While computing $D_{Seq}$, we choose the length of the testing sequence as 5000. For each query, the computation cost of $D_{Seq}$ is 25 times that of $D_{ME1\ and\ DME2}$. Taking into account the significant reduction in computation, the proposed new metric outperforms the existing ones.

Figure 4:
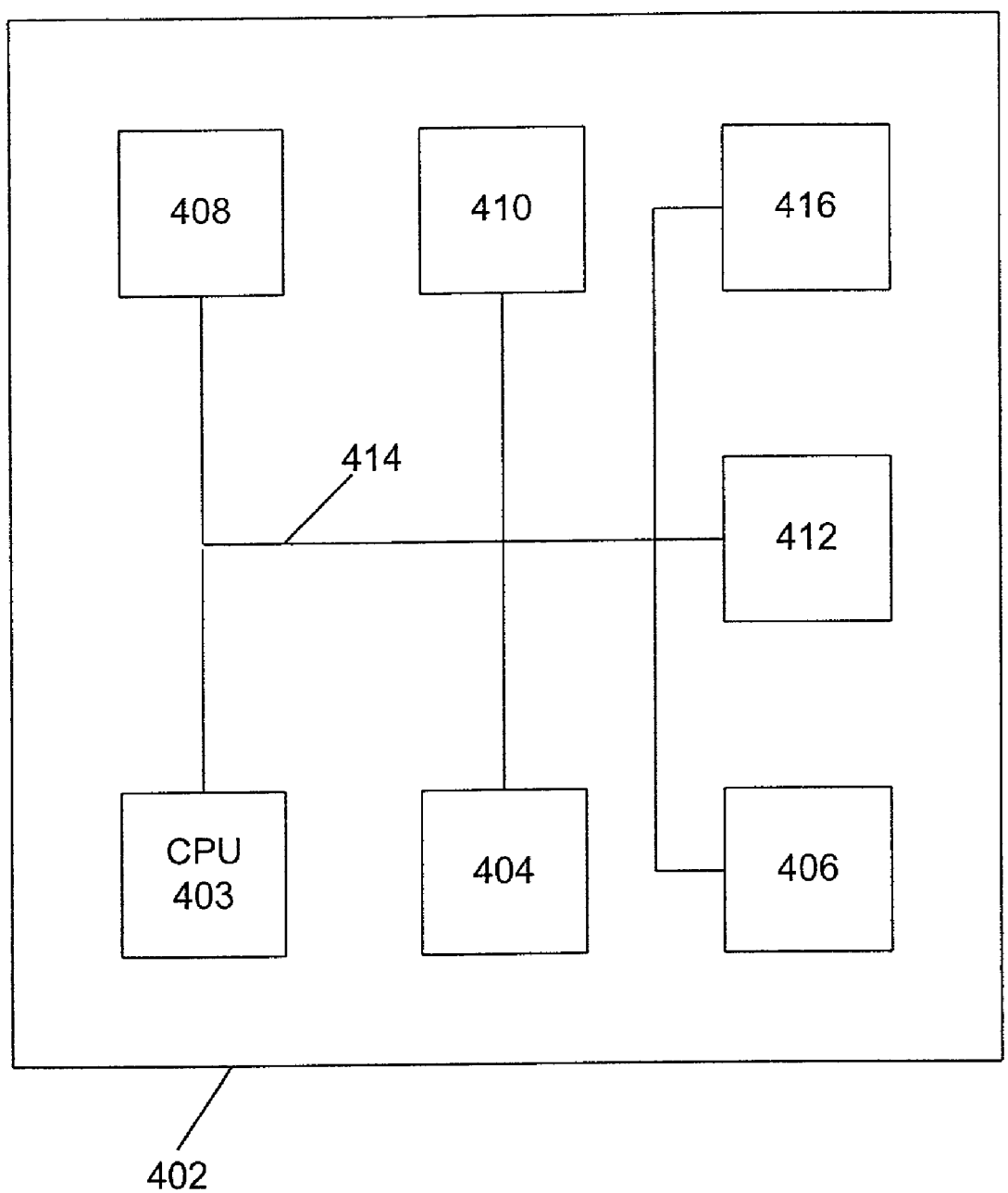
FIG. 4 is a block diagram of a computer system useful in practicing our invention.

Preferably, the present invention is implemented using a computer system 402 as shown in FIG. 4. This computer includes central processing unit ("CPU") 403, memory unit 404, one or more storage devices 406, one or more input devices 408, display device 410, and communication interface 412. A system bus 414 is provided for communicating between the above elements. Another output device, such as printer 416, may also be included as part of system 402.

This computer illustratively is an IBM compatible personal computer, but one skilled in the art will understand that the system is not limited to a particular size, class or model of computer. CPU 403 illustratively is one or more microprocessors such as the Pentium™ class of microprocessors available from Intel. Memory unit 404 typically includes both some random access memory (RAM) and some read only memory (ROM).

Input devices 408, which illustratively include a keyboard, a mouse, and/or other similar device, receive data. The inputted data is stored in storage device 406. Storage devices 406 illustratively include one or more removable or fixed disk drives, compact discs, DVDs, or tapes. Output device 410 illustratively is a computer display, such as a CRT monitor, LED display or LCD display. Communication interface 412 may be a modem, a network interface, or other connection to external electronic devices, such as a serial or parallel port. For some applications of the invention it is anticipated that this interface will include a connection to the Internet.

PDF data is entered into computer system 402 via input device 408 and/or communication device 412 and stored in storage device 406. Processor 403 calculates the distance between PDF's in accordance with equations 8-12 following a suitable computer program stored in memory unit 404 and/or storage device 406 that implements the solution of these equations. Display 410 depicts the results.

As will be apparent to those skilled in the art numerous modifications may be made in the practice of our invention.

What is claimed is:

1. A method executed in a computer of computing a distance measure between first mixture type probability distribution functions, $$G(x) = \sum_{i=1}^{N} \mu_i g_i(x),$$

pertaining to a set data collected from a first source, and a second mixture type probability distribution function $$H(x) = \sum_{k=1}^{K} \gamma_k h_k(x),$$

pertaining to another set of collected data, the improvement characterized by:

said distance measure being $$D_M(G, H) = \min_{w=[\omega_{ik}]} \sum_{i=1}^{N} \sum_{k=1}^{K} \omega_{ik} d(g_i, h_k),$$

where $d(g_i, h_k)$ is a function of the distance between component $g_i$ of the first probability distribution function and component $h_k$ of the second probability distribution function where $$\sum_{i=1}^{N} \mu_i = 1 \text{ and } \sum_{k=1}^{K} \gamma_k = 1,$$

$\omega_{ik} \geq 0$ for $1 \leq i \leq N$, and for $1 \leq k \leq K$, and $$\sum_{k=1}^{K} \omega_{ik} = \mu_i, 1 \leq i \leq N, \sum_{i=1}^{N} \omega_{ik} = \gamma_k, 1 \leq k \leq K,$$

and
    making a determination, based on said computed overall distance as to whether said another set of collected data pertains to said source.

2. The method according to claim 1 wherein at least one of said first and second mixture probability distribution functions includes a Gaussian Mixture Model.

3. The method according to claim 1 wherein the element distance between the first and second probability distance functions is a Kullback Leibler Distance.

4. The method of claim 1 wherein the first and second probability distribution functions are Gaussian mixture models derived from audio segments.

5. A computer program embedded in a storage medium for computing a distance measure between first and second mixture type probability distribution functions, $$G(x) = \sum_{i=1}^{N} \mu_i g_i(x),$$

pertaining to a set data collected from a first source, and $$H(x) = \sum_{k=1}^{K} \gamma_k h_k(x),$$

pertaining to another set of collected data, the improvement comprising a software module of said computer program that evaluates said distance measure in accordance with equation:

$$D_M(G, H) = \min_{w=[\omega_{ik}]} \sum_{i=1}^{N} \sum_{k=1}^{K} \omega_{ik} d(g_i, h_k),$$

where $d(g_i, h_k)$ is a function of distance between a component, $g_i$, of the first probability distribution function and a component, $h_k$, of the second probability distribution function where $$\sum_{i=1}^{N} \mu_i = 1 \text{ and } \sum_{k=1}^{K} \gamma_k = 1,$$

$\omega_{ik} \geq 0$, $1 \leq i \leq N$, $1 \leq k \leq K$,
there exists some value of i for which $\omega_{ik} > 0$ for at least two values of k, and $$\sum_{k=1}^{K} \omega_{ik} = \mu_i, 1 \leq i \leq N, \sum_{i=1}^{N} \omega_{ik} = \gamma_k, 1 \leq k \leq K,$$

and
    making a determination, based on said computed overall distance as to whether said another set of collected data pertains to said source.

6. The computer program according to claim 5 wherein at least one of said first and second mixture probability distribution functions includes a Gaussian Mixture Model.

7. The computer program according to claim 5 wherein the element distance between the first and second probability distance functions includes Kullback Leibler Distance.

8. The computer program of claim 5 wherein the first and second probability distribution functions are Gaussian mixture models derived from audio segments.

9. A computer system for computing a distance measure between first and second mixture type probability distribution functions, $$G(x) = \sum_{i=1}^{N} \mu_i g_i(x), \text{ and } H(x) = \sum_{k=1}^{K} \gamma_k h_k(x),$$

pertaining to audio data comprising:
    memory for storing said audio data;
    a processing module for deriving one of said mixture type probability distribution functions from said audio data; and
    a processing module for evaluating said distance measure in accordance with $$D_M(G, H) = \min_{w=[\omega_{ik}]} \sum_{i=1}^{N} \sum_{k=1}^{K} \omega_{ik} d(g_i, h_k),$$

where $d(g_i, h_k)$ is a function of the distance between a component, $g_i$, of the first probability distribution function and a component, $h_k$, of the second probability distribution function,
where $$\sum_{i=1}^{N} \mu_i = 1 \text{ and } \sum_{k=1}^{K} \gamma_k = 1,$$

and
    $\omega_{ik} \geq 0$, $1 \leq i \leq N$, $1 \leq k \leq K$,
and there exists some value of i for which $\omega_{ik} > 0$ for at least two values of k, and $$\sum_{k=1}^{K} \omega_{ik} = \mu_i, 1 \leq i \leq N, \sum_{i=1}^{N} \omega_{ik} = \gamma_k, 1 \leq k \leq K.$$

10. The computer system according to claim 9 wherein at least one of said first and second mixture probability distribution functions includes a Gaussian Mixture Model.

11. The computer system according to claim 9 wherein the element distance between the first and second probability distance functions includes Kullback Leibler Distance.

12. The computer system of claim 9 wherein the first and second probability distribution functions are Gaussian mixture models derived from audio segments.

13. A method executed in a computer for computing a distance measure between a mixture type probability distribution function $$G(x) = \sum_{i=1}^{N} \mu_i g_i(x),$$

pertaining to a set data collected from a first source, where $\mu_i$ is a weight imposed on component $g_i(x)$, and a mixture type probability distribution function $$H(x) = \sum_{k=1}^{K} \gamma_k h_k(x),$$

pertaining to another set of collected data, where $\gamma_k$ is a weight imposed on component $h_k$ comprising the steps of:
  computing an element distance, $d(g_i, h_k)$, between each $g_i$ and each $h_k$ where $1 \leq i \leq N, 1 \leq k \leq K$,
  computing an overall distance, denoted by $D_M(G, H)$, between the mixture probability distribution function G, and the mixture probability distribution function H, based on a weighted sum of the all element distances, $$\sum_{i=1}^{N} \sum_{k=1}^{K} \omega_{ik} d(g_i, h_k),$$

wherein weights $\omega_{i,k}$ imposed on the element distances $d(g_i, h_k)$, are chosen so that the overall distance $D_M(G, H)$ is minimized, subject to
$\omega_{ik} > 0$ for at least two values of k for each value of i, $$\sum_{i=1}^{N} \omega_{ik} = \gamma_k, 1 \leq k \leq K, \text{ and}$$

$$\sum_{k=1}^{K} \omega_{ik} = \mu_i, 1 \leq i \leq N,$$

and
  making a determination, based on said computed overall distance as to whether said another set of collected data pertains to said source.

14. The method according to claim 13 wherein at least one of said first and second mixture probability distribution functions includes a Gaussian Mixture Model.

15. The method according to claim 13 wherein the element distance between the first and second probability distance functions includes Kullback Leibler Distance.

16. The method of claim 13 wherein the first and second probability distribution functions are Gaussian mixture models derived from audio segments.

17. A method executed in a computer for content-based searching of stored data that pertains to a physical attribute of a system comprising the steps of:
  acquiring a collection of physical attributes data; and
  transforming said collection of physical attributes data into a signal tat is outputted by said computer; where said transforming is effected by:
    identifying collections in said stored data;
    developing a probability distribution function for each of said identified collections;
    developing a probability distribution function for the acquired collection;
    developing a distance measure between the developed probability distribution function of said acquired collection and developed probability distribution functions for said identified collections;
    applying a threshold to the developed distance measure to discover those of said identified segments with a distance measure below said preselected threshold value, where said distance is directly computed according to a measure that guarantees to satisfy the non-negativeness, symmetry, and triangular inequality properties of a distance measure; and
    developing said output signal based on step of applying
  where said distance measure between a first probability function, $$G(x) = \sum_{i=1}^{N} \mu_i g_i(x),$$

and a second probability function, $$H(x) = \sum_{k=1}^{K} \gamma_k h_k(x),$$

is $$D_M(G, H) = \min_{w=[\omega_{ik}]} \sum_{i=1}^{N} \sum_{k=1}^{K} \omega_{ik} d(g_i, h_k),$$

where
  $d(g_i, h_k)$ is a function of the distance between a component, $g_i$, of the first probability distribution function and a component $h_k$, of the second probability distribution function, $$\sum_{i=1}^{N} \mu_i = 1 \text{ and } \sum_{k=1}^{K} \gamma_k = 1,$$

$\omega_{ik} \geq 0, 1 \leq i \leq N, 1 \leq k \leq K,$ $$\sum_{k=1}^{K} \omega_{ik} = \mu_i, 1 \leq i \leq N, \sum_{i=1}^{N} \omega_{ik} = \gamma_k, 1 \leq k \leq K,$$

and
  there exists some value of i for which $\omega_{ik} > 0$ for at least two values of k.

18. A method executed in a computer comprising the steps of:
  identifying speaker segments in provided audio-visual data based on speech contained in said data;

developing a probability distribution function for each of said segments from data points within each of said segments; and developing distance measures among said probability distribution functions, where each of said measures is obtained through a one-pass evaluation of a function that guarantees to satisfy the non-negativeness, symmetry, and triangular inequality properties of a distance measure where said distance measure between a first probability function, $$G(x) = \sum_{i=1}^{N} \mu_i g_i(x),$$

and a second probability function, $$H(x) = \sum_{k=1}^{K} \gamma_k h_k(x),$$

is $$D_M(G, H) = \min_{w=[\omega_{ik}]} \sum_{i=1}^{N} \sum_{k=1}^{K} \omega_{ik} d(g_i, h_k),$$

where $d(g_i, h_k)$ is a function of the distance between a component, $g_i$, of the first probability distribution function and a component, $h_k$, of the second probability distribution function, $$\sum_{i=1}^{N} \mu_i = 1 \text{ and } \sum_{k=1}^{K} \gamma_k = 1,$$

$\omega_{ik} \geq 0$, $1 \leq i \leq N$, $1 \leq k \leq K$, $$\sum_{k=1}^{K} \omega_{ik} = \mu_i, 1 \leq i \leq N, \sum_{i=1}^{N} \omega_{ik} = \gamma_k, 1 \leq k \leq K,$$

and there exists some value of i for which $\omega_{ik} > 0$ for at least two values of k.

* * * * *